United States Patent [19]

Ishimine

[11] Patent Number: 5,764,227

[45] Date of Patent: Jun. 9, 1998

[54] DOCUMENT DISPLAY APPARATUS FOR DISPLAYING DOCUMENT CONTAINING A PLURALITY OF PAGES.

[75] Inventor: Hisako Ishimine, Kanagawa, Japan

[73] Assignee: Fuji Xerox Co., Ltd., Tokyo, Japan

[21] Appl. No.: 634,558

[22] Filed: Apr. 18, 1996

[30] Foreign Application Priority Data

Apr. 20, 1995 [JP] Japan ................... 7-117732

[51] Int. Cl.$^6$ .................. G06F 15/00; G06F 3/14
[52] U.S. Cl. .............................. 345/344; 707/908
[58] Field of Search ................. 345/119, 120, 345/340, 901; 395/344, 345, 779, 785, 789, 792, 935, 937, 942, 943, 944

[56] References Cited

U.S. PATENT DOCUMENTS

| | | | |
|---|---|---|---|
| 4,907,283 | 3/1990 | Tanaka et al. | 382/229 |
| 5,021,989 | 6/1991 | Fujisawa et al. | 395/943 |
| 5,333,255 | 7/1994 | Damouth | 395/344 X |
| 5,499,330 | 3/1996 | Lucas et al. | 395/776 |
| 5,586,245 | 12/1996 | Sugai et al. | 395/344 |

FOREIGN PATENT DOCUMENTS

| | | |
|---|---|---|
| 62-254272 | 11/1987 | Japan . |
| 63-68974 | 3/1988 | Japan . |

OTHER PUBLICATIONS

Robert Cowart, Mastering Windows 3.1 Special Edition, Sybex, Inc., pp. 403–414, 1993.

*Primary Examiner*—Raymond J. Bayerl
*Assistant Examiner*—Seth D. Vail
*Attorney, Agent, or Firm*—Finnegan, Henderson, Farabow, Garrett & Dunner, L.L.P.

[57] ABSTRACT

A document display apparatus of the invention displays a document containing a plurality of pages in such a manner that one page lies on top of another, allowing easy and intuitive identification of the first page of the document. When a page turning command is entered through an input device, a designator specifies a page which should become the first page of the document based on page layering sequence information stored in a page data table memory and a page location calculator calculates new display locations of the individual pages so that pages to be shown behind a current page (or the page in the topmost layer) are successively displaced from the current page by an amount determined by preset page offset values ($\Delta X$, $\Delta Y$) except for the first page of which amount of displacement is increased by an additional page offset value ($+\alpha$) in both the horizontal and vertical directions. An updating device updates information stored in the page data table memory in accordance with the newly calculated display locations and a display processor produces on-screen images of the individual pages based on the information stored in the page data table memory.

8 Claims, 13 Drawing Sheets

| PAGE NO. | PAGE ORIGIN | SIZE | ORIEN-TATION | CON-TENTS | FLAG |
|---|---|---|---|---|---|
| 1 | (x1,y1) | A3 | LENGTH | # | |
| 2 | (x2,y2) | A4 | SIDE | # | |
| 3 | (x3,y3) | B5 | LENGTH | # | * |
| ... | .... | ... | ... | .. | ... |
| 7 | (x7,y7) | B4 | SIDE | # | |

| PAGE NO. | PAGE ORIGIN | SIZE | ORIEN-TATION | CON-TENTS | FLAG |
|---|---|---|---|---|---|
| 1 | (40,40) | A3 | LENGTH | # | * |
| 2 | (30,30) | A4 | SIDE | # | |
| 3 | (20,20) | B5 | LENGTH | # | |
| 4 | (10,10) | A3 | LENGTH | # | |
| 5 | (0,0) | B4 | SIDE | # | |

FIG. 12(a)

| PAGE NO. | PAGE ORIGIN | SIZE | ORIEN-TATION | CON-TENTS | FLAG |
|---|---|---|---|---|---|
| 1 | (0,0) | A3 | LENGTH | # | |
| 2 | (45,45) | A4 | SIDE | # | * |
| 3 | (35,35) | B5 | LENGTH | # | |
| 4 | (25,25) | A3 | LENGTH | # | |
| 5 | (15,15) | B4 | SIDE | # | |

FIG. 12(b)

PAGE CONTENT DISPLAY ↓

| PAGE NO. | | PAGE ORIGIN | SIZE | ORIEN-TATION | CON-TENTS | FLAG |
|---|---|---|---|---|---|---|
| 1 | ON | (40,40) | A3 | LENGTH | # | |
| 2 | ON | (30,30) | A4 | SIDE | # | |
| 3 | ON | (20,20) | B5 | LENGTH | # | |

REVERSE SIDE DISPLAY ↓

| PAGE NO. | DOUBLE-SIDED | | PAGE ORIGIN | SIZE | ORIEN-TATION | CON-TENTS | FLAG |
|---|---|---|---|---|---|---|---|
| 1 | TRUE | ON | (40,40) | A3 | VERTICAL | # | * |
| 2 | FALSE | OFF | (30,30) | A4 | HORIZONTAL | # | |
| 3 | FALSE | OFF | (20,20) | B5 | VERTICAL | # | |
| 4 | TRUE | OFF | (10,10) | A3 | VERTICAL | # | |
| 5 | FALSE | OFF | (0,0) | B4 | HORIZONTAL | # | |

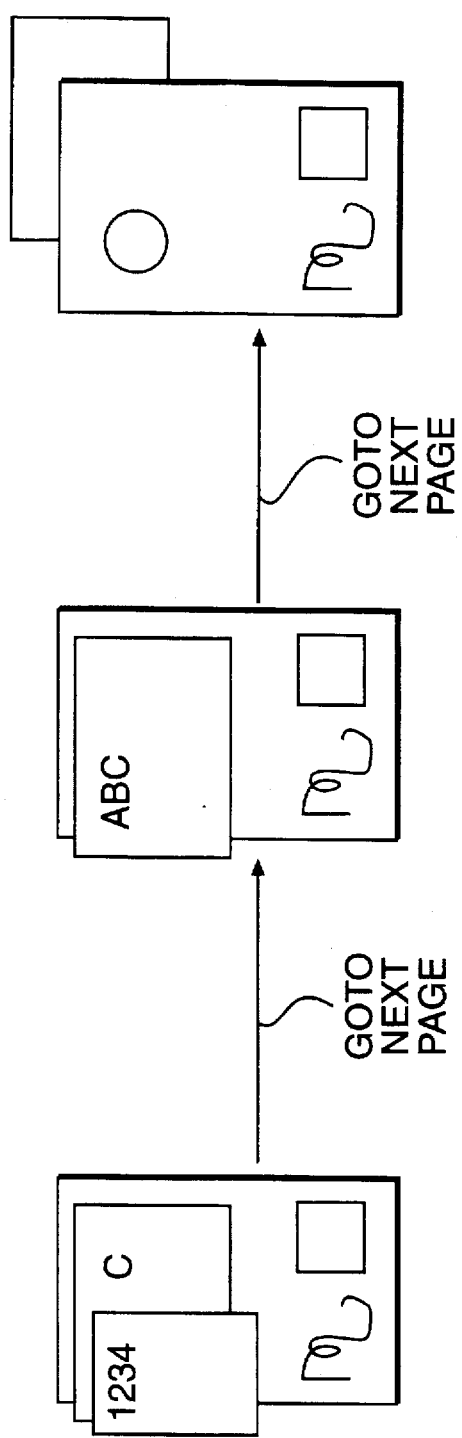

DOCUMENT DISPLAY APPARATUS FOR DISPLAYING DOCUMENT CONTAINING A PLURALITY OF PAGES.

BACKGROUND OF THE INVENTION

The present invention relates to a document display apparatus for displaying a document containing a plurality of pages on a display screen in such a manner that one page lies on top of another with successive displacements and, more particularly, relates to a document display apparatus which allows easy recognition of each individual page of the document.

In document processing, various ideas and improvements have been proposed heretofore to make it possible to manipulate an on-screen image of a document created from electronic data as conveniently as an ordinary printed document. An example of such conventional approach is disclosed in Japanese Patent Unexamined Publication Nos. Sho. 62-254272 and Sho. 63-68974, in which a document display apparatus presents a multiple-page document with its individual pages stacked on a display screen.

In this conventional document display apparatus, individual pages of the document are displaced, or arranged in a series of steps, so that the on-screen document image seems to have a certain thickness. With this stepped alignment scheme, it is easy to page through the document by pointing directly to a desired page or to a tab attached thereto. Furthermore, in this document display apparatus, it is possible to successively turn pages in either the forward or backward direction as well as to directly jump to a specific page so that it is brought to the forefront of the stacked pages.

In the conventional type of document display apparatus described above, however, it is not possible to intuitively identify the first page (or front page) of the document when a page turning sequence has been executed, because the individual pages are stacked one upon another with a fixed amount of successive displacements. Generally speaking, the sequence in which individual pages of a document are stacked is important in providing information to a reader in a logical manner. The conventional document display apparatus lacks ease of operation in that it does not allow a user to easily identify the first page which is used as a reference when paging through the document. This means that the conventional document display apparatus can not be as convenient as a printed document.

Furthermore, the conventional document display apparatus displays images of the individual pages in a fixed size. Therefore, even if the document contains pages of different sizes, the conventional document display apparatus can not display these pages according to their true sizes. This limitation in providing true images of the individual pages also makes it difficult to provide convenient use comparable to a printed document.

SUMMARY OF THE INVENTION

The invention has been made to overcome the aforementioned problems of the prior art. Accordingly, it is an object of the invention to provide a document display apparatus for displaying a document containing a plurality of pages on a display screen in such a manner that one page lies on top of another with successive displacements, whereby the on-screen document can be utilized as conveniently as an ordinary printed document.

More specifically, it is an object of the invention to provide a document display apparatus which allows easy and intuitive identification of the first page of the document so that the on-screen document can be utilized as conveniently as an ordinary printed document.

It is another object of the invention to provide a document display apparatus which displays individual pages of the document in their respective formats so that the on-screen document can be utilized as conveniently as an ordinary printed document.

It is yet another object of the invention to provide a document display apparatus which can display data contents of an underlying page in such a portion thereof that shows outside any overlying page so that the on-screen document can be utilized as conveniently as an ordinary printed document.

According to a first aspect of the invention, a document display apparatus for displaying a document containing a plurality of pages on a screen in such a manner that one page lies on top of another with successive displacements, comprises an input device for entering page turning commands, a page data table memory for storing information on a layering sequence and display locations of the individual pages as well as a selection of a page which should currently be shown in a topmost layer, a designator for specifying a page which should become the first page of the document based on the layering sequence information stored in the page data table memory, a page location calculator for calculating new display locations of the individual pages when a page turning command is entered so that pages to be shown in other than the topmost layer are arranged with a preset amount of successive displacements from the page to be shown in the topmost layer except for the first page which is displaced by a larger amount than the other pages, an updating device for updating the information stored in the page data table memory in accordance with the page turning command and newly calculated display locations, and a display processor for producing on-screen images of the individual pages based on the information stored in the page data table memory.

In thus constructed document display apparatus, pages shown in other than the topmost layer are successively displaced from the current page by an amount determined by preset page offset values ($\Delta X$, $\Delta Y$) except for the first page of which amount of displacement is increased by an additional page offset value ($+\alpha$) in both the horizontal and vertical directions. Since the displacement of the first page from its preceding page is larger than any other pages, a user can easily identify the first page no matter where it is located in the layering sequence. This arrangement would make it possible to utilize a document created from electronic data as conveniently as an ordinary printed document.

In one variation of the invention, the display processor produces an on-screen image of the first page in a different way from the other pages.

According to this variation, the first page may be shown in a different color, for example, so that the user can identify the first page even more easily.

In another variation of the invention, the page data table memory additionally stores information on formats of the individual pages and the display processor produces images of the pages to be shown in other than the topmost layer in the same format as the page to be shown in the topmost layer.

This variation would serve to provide an uncluttered on-screen presentation of the document since the pages in other than the topmost layer are shown in the same frame size and orientation as the page in the topmost layer even when the individual pages are produced in different formats.

In a further variation of the invention, the page data table memory also stores information on formats of the individual pages and the display processor produces on-screen images of the individual pages in their respective formats.

Since the individual pages are shown in their unique sizes and orientations in this variation, it would be easier for the user to distinguish each page of the document.

In a yet further variation of the invention, the display processor can display data contents of an underlying page in such a portion thereof that shows outside any overlying page.

This would make it even easier to distinguish the individual pages of the document.

BRIEF DESCRIPTION OF THE DRAWINGS

FIGS. 12(a)–12(b) are diagrams showing other examples of data contents stored in the page data table memory;

FIGS. 18(a)–18(c) are conceptual diagrams illustrating how the document is displayed in a page turning sequence according to the second embodiment of the invention;

DETAILED DESCRIPTION OF THE PREFERRED EMBODIMENTS

Referring now to FIGS. 1 to 13, a document display apparatus according to a first embodiment of the invention is described.

Figures 1, 3:
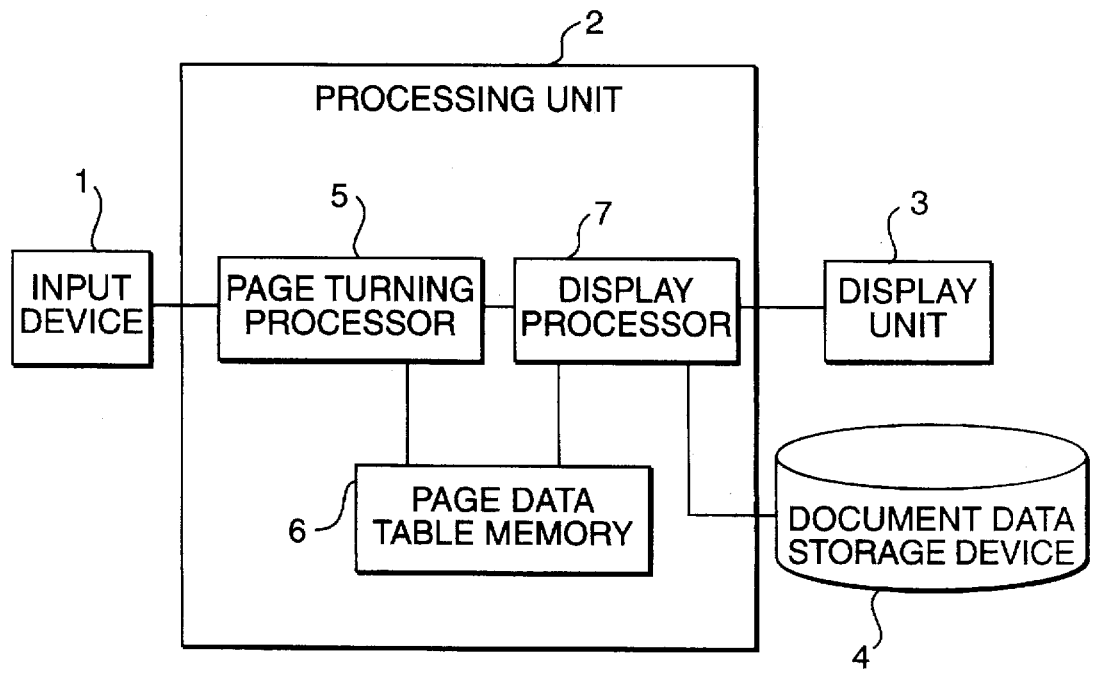
FIG. 1 is a block diagram showing the construction of a document display apparatus according to a first embodiment of the invention.
FIG. 3 is a diagram showing an example of data contents stored in a page data table memory.

As shown in FIG. 1, the document display apparatus of this embodiment comprises an input device 1 including a keyboard and a mouse, for instance, to allow a user to enter a page turning command, a processing unit 2 for executing data processing tasks such as page turning and document display sequences in accordance with the page turning command, a display unit 3 for displaying images of a document on a screen and a document data storage device 4 including a hard disk for storing real data which is actually processed.

The processing unit 2 comprises a page turning processor 5 for performing page turning sequences in accordance with the page turning command, a page data table memory 6 for storing information on individual pages that constitute the document and a display processor 7 for producing a document image to be shown on the display unit 3.

The page data table memory 6 stores information on a plurality of pages of the document as shown in FIG. 3, including page numbers which define a layering sequence of the individual pages, coordinates of page origins, i.e., the upper-left corners of page frames, which determine on-screen locations of the individual pages, sizes and orientations of the individual pages, a flag which specifies the current page (i.e., the page currently displayed in the topmost layer), as well as a page content pointer which relates real data held in a particular location of the document data storage device 4 to each individual page of the document. In FIG. 3, a current flag denoted by an asterisk (*) is set to the third page. This means that the third page is currently displayed in the top layer of the document. In this example, the third page has a B5-size page frame in portrait format with its upper-left corner located at origin coordinates (x3, y3).

Figure 2:
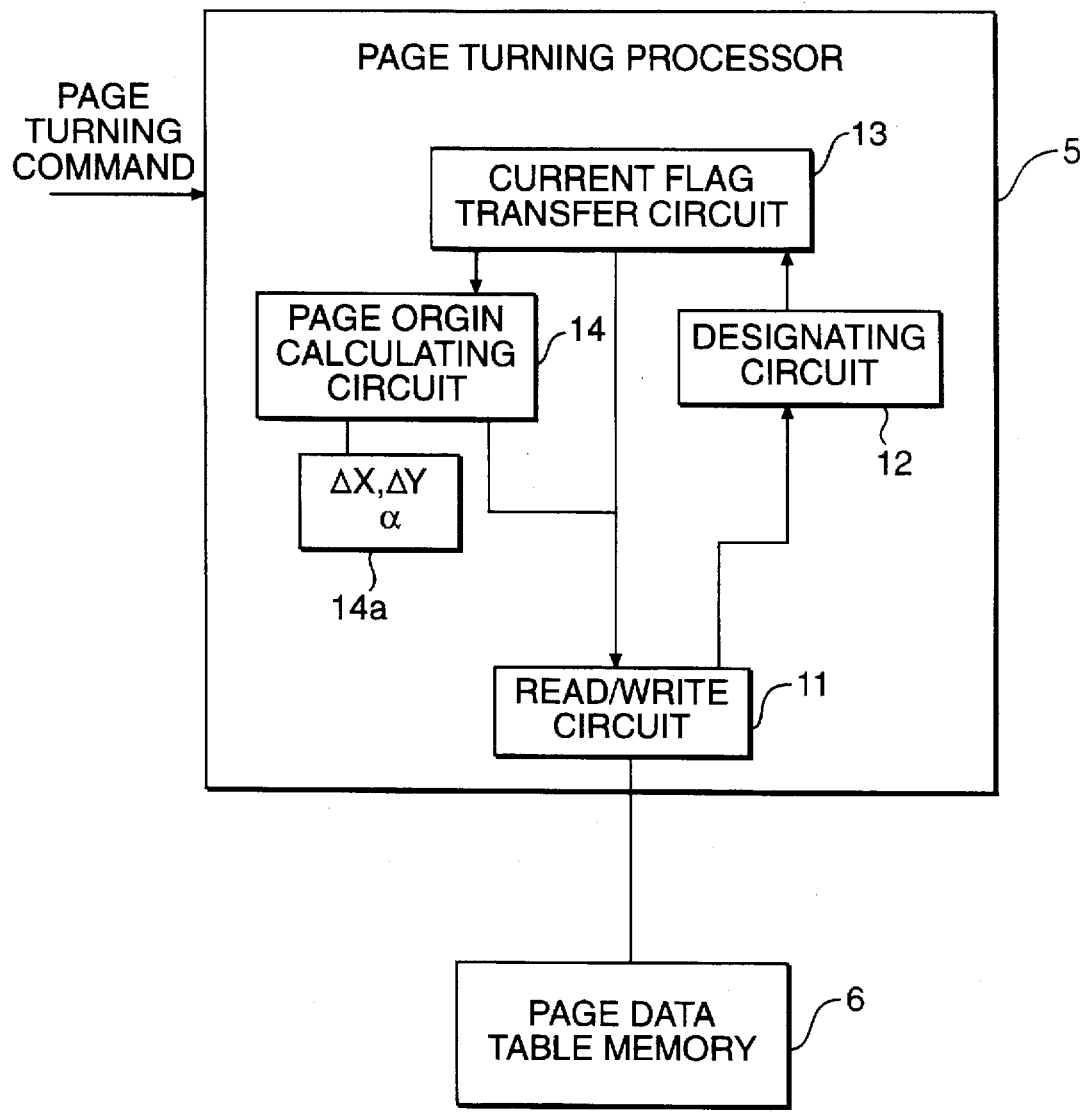
FIG. 2 is a block diagram showing the construction of a page turning processor.

Referring to FIG. 2, the page turning processor 5 comprises a read/write circuit 11 for reading and writing information in the page data table memory 6, a designating circuit 12 for specifying the first page of the document based on page number information stored in the page data table memory 6, a current flag transfer circuit 13 for reassigning the current flag to a page which has been selected to be sent to the topmost layer in accordance with the page turning command, and a page origin calculating circuit 14 for calculating on-screen location of the origin of the newly designated current page as well as those of the other pages.

The page origin calculating circuit 14 is provided with a table memory 14a which stores preset page offset values $\Delta X$, $\Delta Y$ and $\alpha$. The offset values $\Delta X$ and $\Delta Y$ determine the amount of on-screen displacement of the origin of each successive page hidden behind the current page, whereas the offset value $a$ determines the amount of additional displacement which is applied exclusively to the origin of the first page.

As seen in the above discussion, information on the individual pages of the document is modified by the circuits 12 to 14 in accordance with the page turning command and written into the page data table memory 6 by the read/write circuit 11, updating its previously stored information.

When the display processor 7 completes its document image production process based on the updated information in the page data table memory 6, the display unit 3 presents a document image redrawn in accordance with the page turning command.

Figure 4:
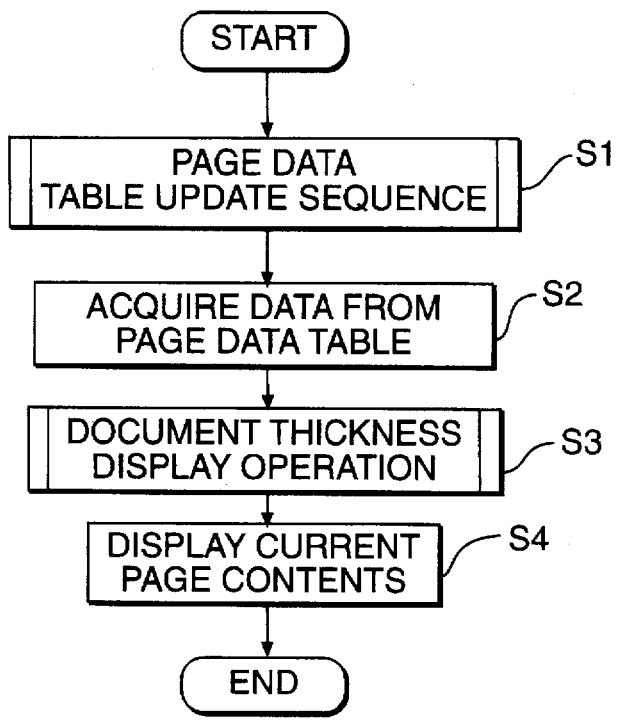
FIG. 4 is a flowchart showing a general operation flow according to the first embodiment of the invention.

In thus constructed document display apparatus, the on-screen document image is obtained through the sequence shown in FIG. 4.

In the flowchart, the page turning processor 5 updates the information stored in the page data table memory 6 in accordance with the page turning command entered via the input device 1 at first (step S1). Then, the display processor 7 acquires the updated information from the page data table memory 6 (step S2) and performs a document thickness display sequence by which thickness of the document is simulated by successively displacing images of its individual pages (step S3). The display processor 7 further performs an operating sequence for displaying contents of the current page based on document data (step S4).

Figure 5:
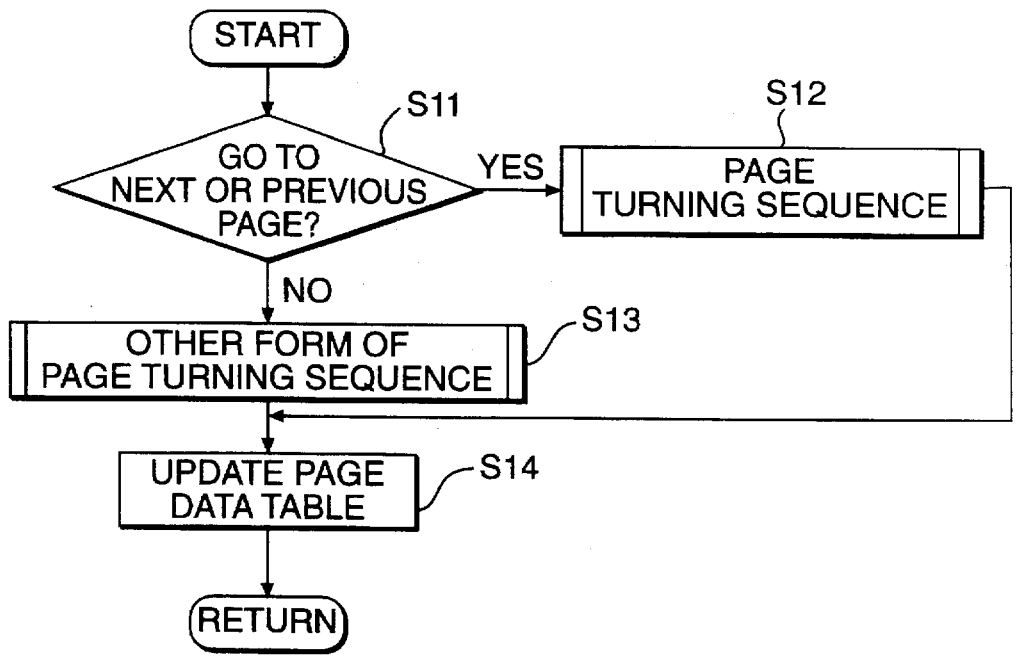
FIG. 5 is a flowchart showing a general operation flow of a page turning sequence.
Figure 6:
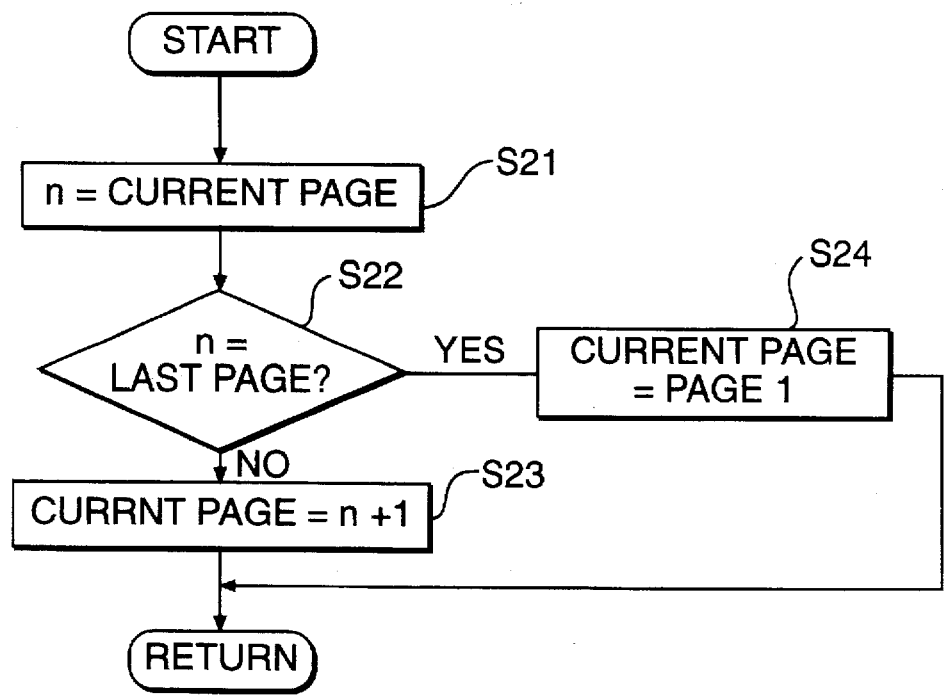
FIG. 6 is a flowchart showing a forward page turning sequence.
Figure 7:
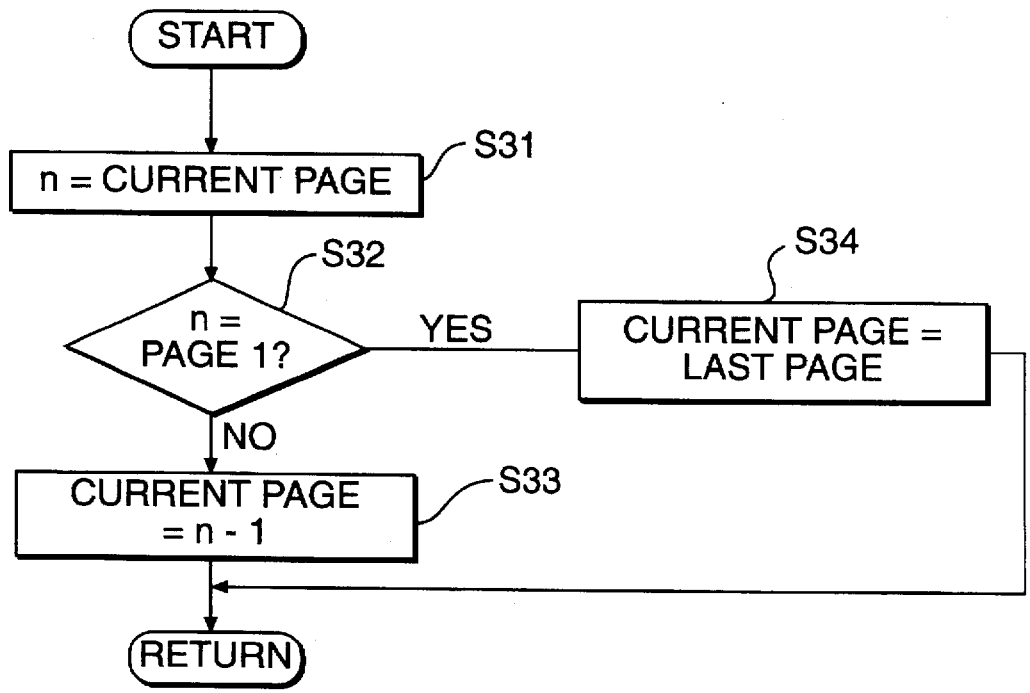
FIG. 7 is a flowchart showing a backward page turning sequence.
Figure 8A:
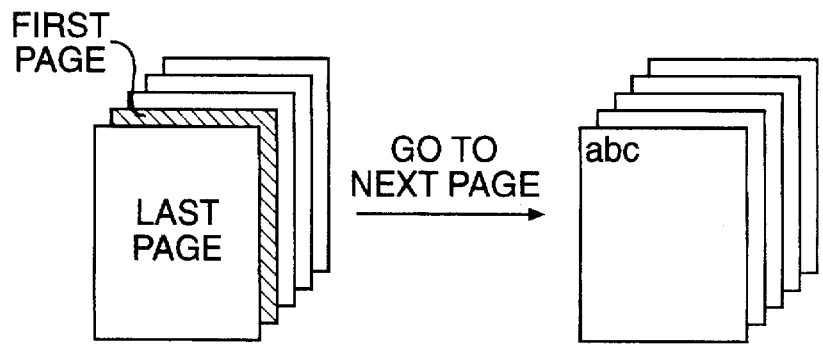
FIGS. 8(a)–8(b) are conceptual diagrams for explaining the forward and backward page turning sequences.
Figure 8B:
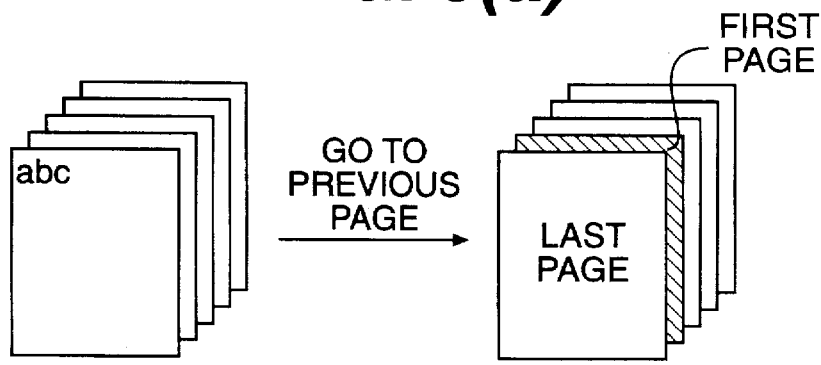
Figure 9:
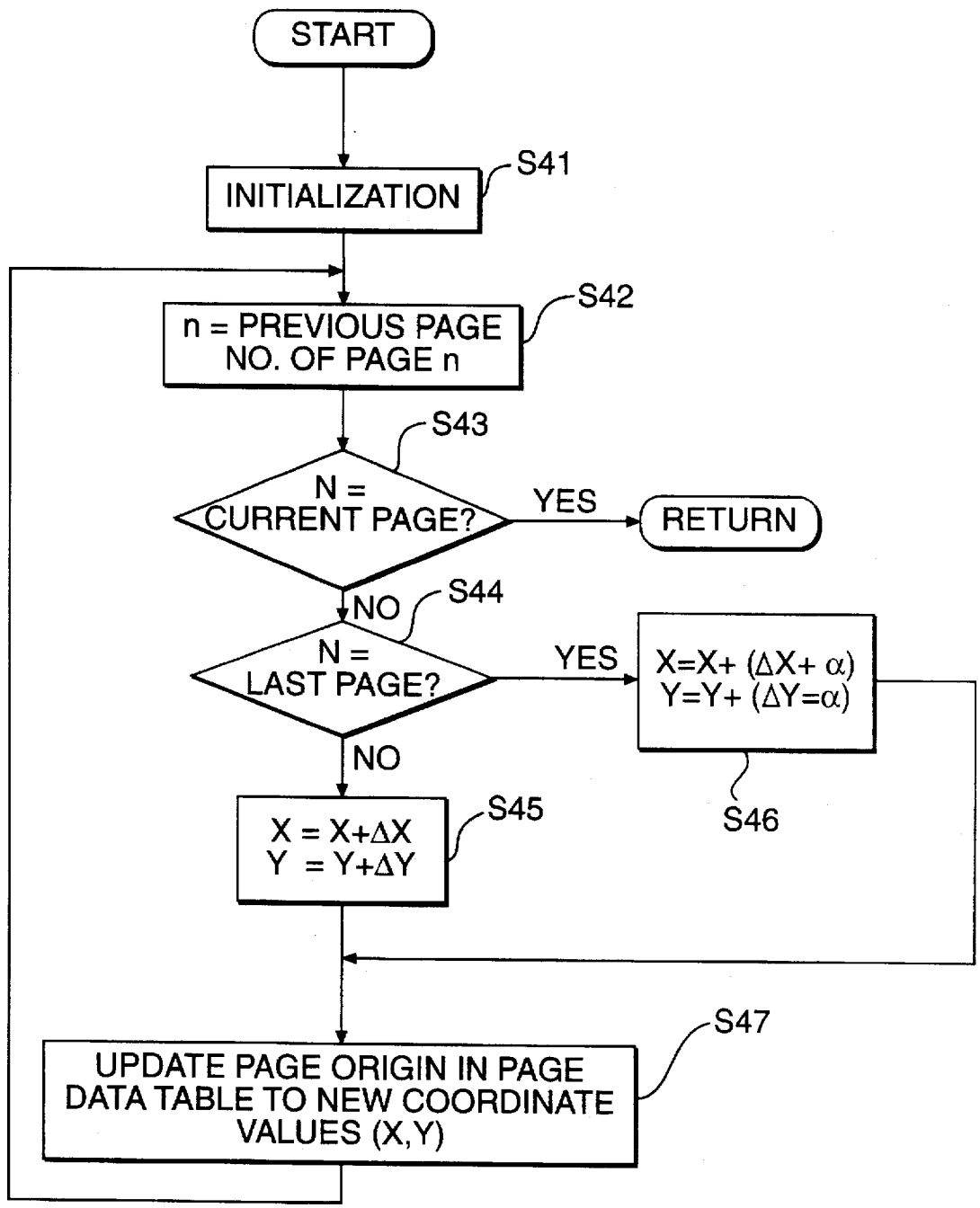
FIG. 9 is a flowchart showing a page origin update sequence.

The page data table update sequence of step S1 includes current page switching sequences shown in FIGS. 5 to 7 and a page origin update sequence shown in FIG. 9.

Specifically, the current page switching sequence is performed in a manner shown in FIG. 5. First, the page turning processor 5 judges whether the page turning command is a request to move one page at a time, to either the next or previous page (step S11). If it is requested to move one page at a time, the page turning processor 5 performs a single-page turning sequence shown in FIG. 6 or 7 (step S12). If a page turning sequence involving a multiple-page jump is requested, the page turning processor 5 performs such sequence according to the flowchart shown in FIG. 14 (step S13).

Then, the read/write circuit 11 updates current flag data in the page data table memory 6 in accordance with current page information which has been modified as a result of the page turning sequence (step S14).

The flowchart of FIG. 6 applies to a forward page turning sequence while the flowchart of FIG. 7 applies to a backward page turning sequence. In the forward page turning sequence shown in FIG. 8(a), the page currently shown in the topmost layer (the last page in the figure) is sent to the rearmost layer. In the backward page turning sequence shown in FIG. 8(b), the page currently shown in the rearmost layer (the last page in the figure) is sent to the topmost layer.

Such page turning sequences are controlled by the current flag transfer circuit 13, wherein the forward or backward page turning sequence is selected in accordance with the page turning command.

In the forward page turning sequence of FIG. 6, a variable n is set to denote the page number of the current page of the document (step S21) and it is judged whether the value of the variable n is same as the page number of the last page of the document (step S22). If the value of the variable n does not correspond to the last page of the document, a next page designated by (n+1) is set as a new current page of the document (step S23). On the contrary, if the value of the variable n corresponds to the last page of the document, the first page which comes after the last page is set as a new current page (step S24).

In the backward page turning sequence of FIG. 7, a variable n is set to denote the page number of the current page of the document (step S31) and it is judged whether the value of the variable n is same as the page number of the first page of the document (step S32). If the value of the variable n does not correspond to the first page of the document, a previous page designated by (n−1) is set as a new current page of the document (step S33). On the contrary, if the value of the variable n corresponds to the first page of the document, the last page which comes before the first page is set as a new current page (step S34).

The above-described page turning sequences are repeatedly carried out by the page origin calculating circuit 14 as many times as the number of page turning commands to select a new current page.

Each time the current page is switched, on-screen page origin locations of the document are all altered using the preset page offset values ($\Delta X$, $\Delta Y$, $\alpha$). This page origin update sequence is executed repeatedly on all the pages of the document starting from its last page and then proceeding toward the current page.

In FIG. 9, a variable n is set to denote the page number of the current page and an initialization process is executed, whereby page origin coordinates of the last page of the document are given by variables X, Y (step S41). Then, the value of the variable n is altered to designate a previous page (step S42) and it is judged whether the new value of the variable n corresponds to the current page of the document (step S43). It is to be noted that the page immediately preceding the current page is the last page of the document in initial conditions.

If it is judged that the value of the variable n corresponds to the current page, the operation flow escapes the subroutine of FIG. 9 since the page origin update sequence is already finished for all the pages of the document at this point. If the value of the variable n designates other than the current page, a further judgment is made as to whether the variable n takes a value corresponding to the last page of the document (step S44), and the operation flow proceeds to further steps.

If it is judged that the value of the variable n designates other than the last page, the horizontal page offset value $\Delta X$ is added to the page origin coordinate variable X while the vertical page offset value $\Delta Y$ is added to the page origin coordinate variable Y to derive new page origin coordinates X, Y (step S45).

On the contrary, if the value of the variable n corresponds to the last page, the horizontal page offset values $\Delta X$ and $\alpha$ are added to the page origin coordinate variable X while the vertical page offset values $\Delta Y$ and $\alpha$ are added to the page origin coordinate variable Y to obtain new page origin coordinate values X, Y (step S46).

At this point, the read/write circuit 11 updates the data contents of the page data table memory 6 with the new values of the variables X, Y (step S47) so that page origin information on each individual page previously stored in the page data table memory 6 is thoroughly overwritten.

Figure 10:
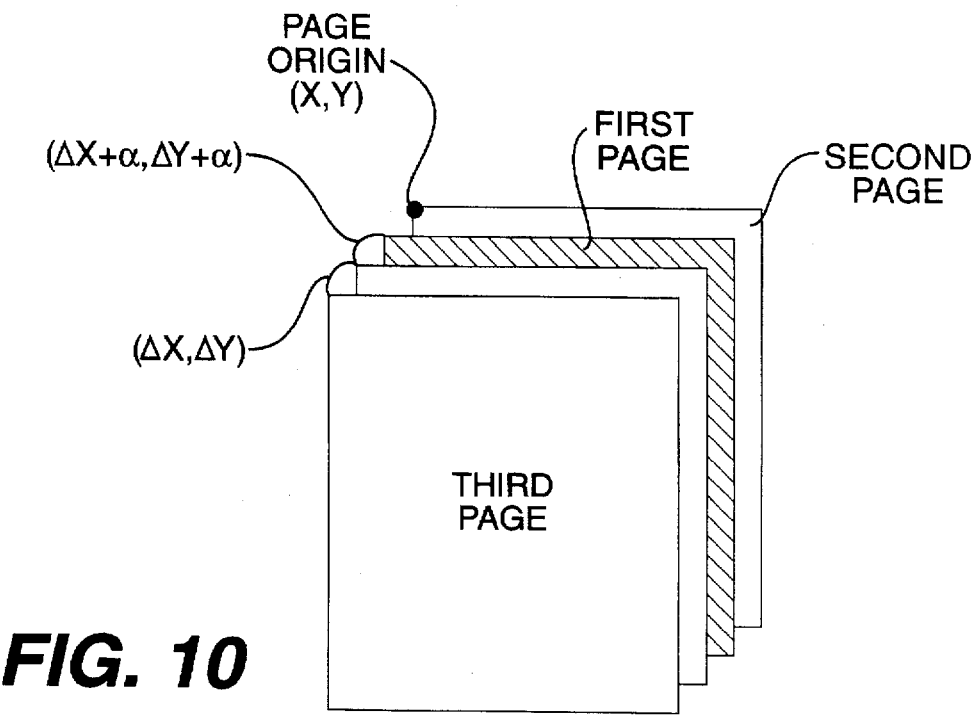
FIG. 10 is a conceptual diagram illustrating how a document is displayed after execution of a page turning sequence.

The result of the above-described page origin update sequence is shown in FIG. 10, wherein the page origin, or the upper-left corner, of each successive page of the document is displaced from the page origin of the rearmost page (page 2 in this example) in a step-by-step manner by an amount determined by the page offset values ($\Delta X$, $\Delta Y$) except for the first page which is further displaced by an amount determined by the additional offset value a in both the horizontal and vertical directions.

Figure 11:
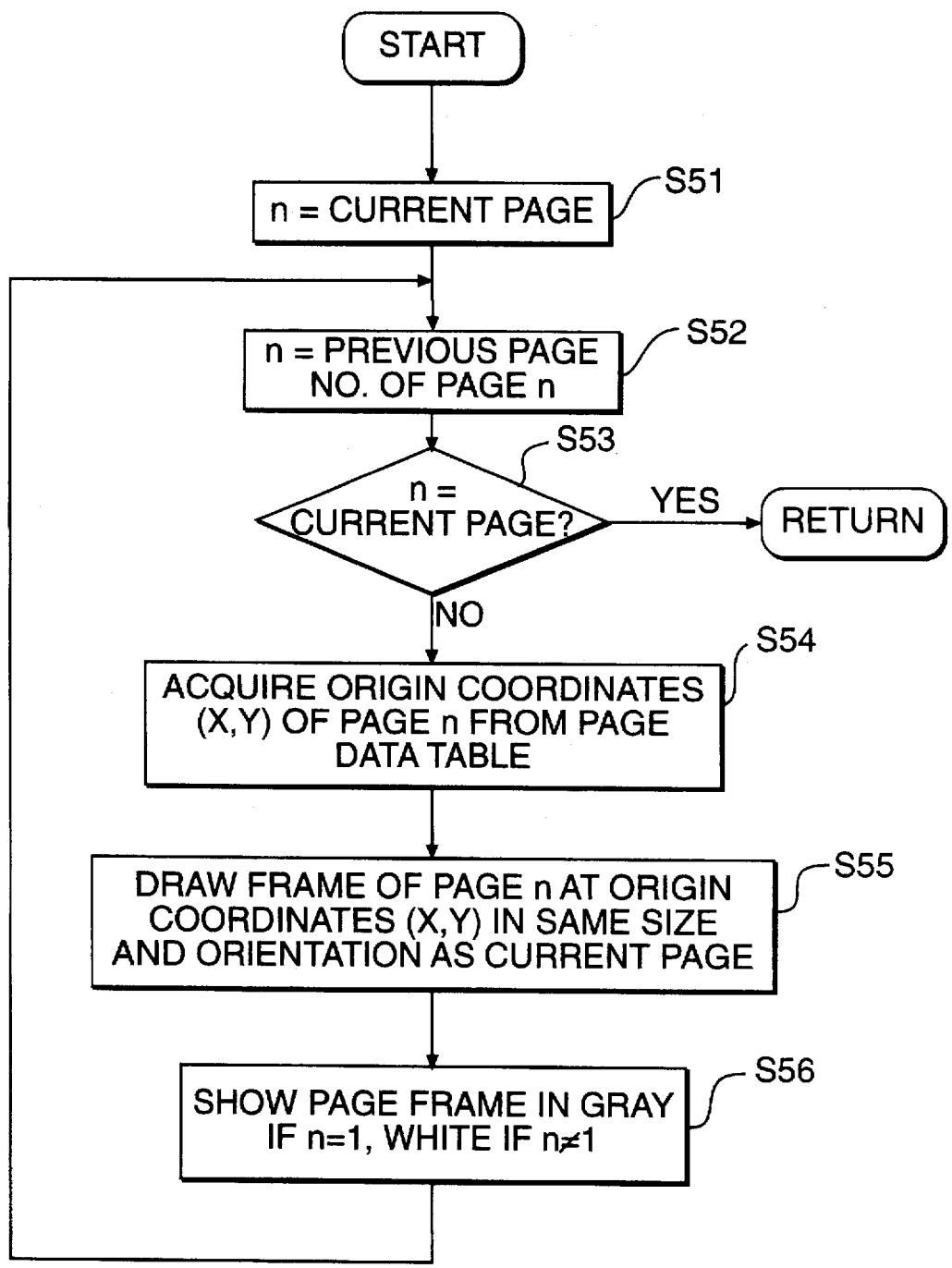
FIG. 11 is a flowchart showing a document thickness display sequence.

The earlier-mentioned document thickness display sequence (step S3) is carried out in a way that is shown in FIG. 11. Generally speaking, this operation is accomplished by sequentially drawing frames of the successive pages of the document based on page information which has been updated by the above-described page turning sequences and read by the display processor 7 out of the page data table memory 6. The individual page frames are drawn one after another for all the pages of the document starting from its last page and then proceeding toward the current page.

Referring to FIG. 11, a variable n is set to denote the page number of the current page of the document (step S51). Then, the value of the variable n is altered to designate a previous page (step S52) and it is judged whether the new value of the variable n corresponds to the current page of the document (step S53). It is to be noted that the page immediately preceding the current page is the last page of the document in initial conditions.

If it is judged that the value of the variable n corresponds to the current page, the operation flow escapes the subroutine of FIG. 10 since the document thickness display sequence is already finished for all the pages of the document at this point. If the value of the variable n designates other than the current page, page origin coordinates (X, Y) of the nth page, which is designated by the value of the variable n, are read out from the page data table memory 6 (step S54).

A frame of the nth page is drawn with its page origin located at thus acquired coordinates (X, Y) in the same size and orientation as the current page (step S55). At this point, the page frame is shaded in gray if the nth page is the first page of the document while it is shown in white if the nth page is other than the first page to give a different look to the first page (step S56). In this page frame drawing operation, the frames of the successive pages, excluding the first page, are drawn relative to their origin coordinates (X, Y) which are varied in a step-by-step manner by the page offset values $\Delta X$ and $\Delta Y$ at a time in the horizontal and vertical directions, respectively, whereas the frame of the first page is drawn relative to its coordinates (X, Y) which are varied by the page offset values $\Delta X+\alpha$ and $\Delta Y+\alpha$ from the preceding page in the horizontal and vertical directions, respectively.

In the example shown in FIGS. 3 and 10, the individual page frames are drawn in the same size (B5) and orientation (portrait format) as the third page which is presently the current page, and they are arranged at regular displacement intervals except for the first page whose frame is drawn in gray with the additional offset value a added to the normal displacement interval.

When the individual page frames of the document have been drawn on the screen as described above, the operation flow proceeds to step S4, where the display processor 7 reads out information about the contents of the current page from the document data storage device 4 based on the page content pointer held in the page data table memory 6, and then displays the acquired page contents inside the frame of the current page. The document image thus produced is displayed on the screen of the display unit 3.

With this arrangement, the user can easily find out at a glance where the first page is presently located, what position the current page takes in the whole document structure and so on from the on-screen document image.

Figure 13:
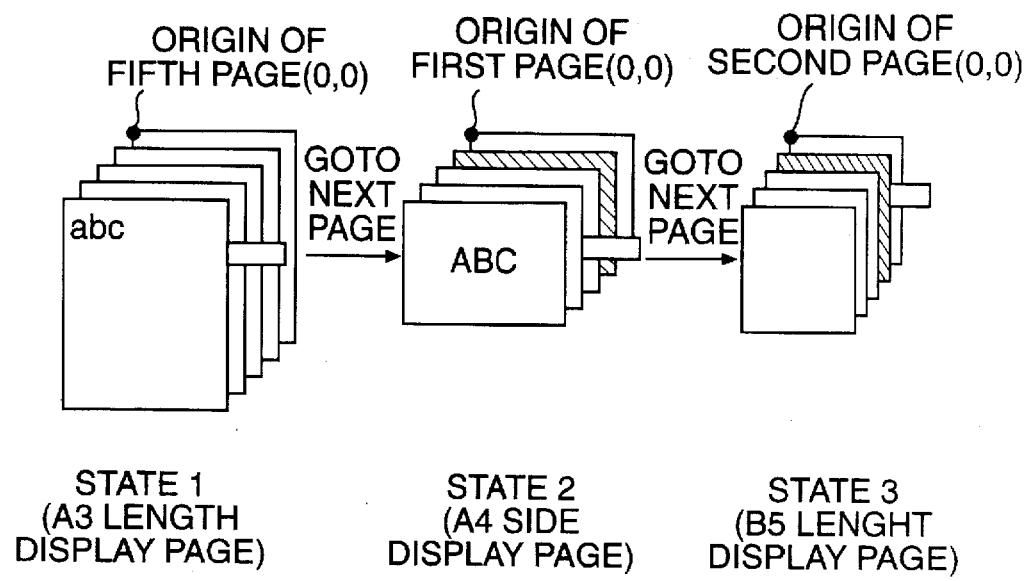
FIG. 13 is a conceptual diagram illustrating how the document is displayed in a page turning sequence.

Each time the current page is altered as a result of the page turning sequence, the individual page frames are redrawn so that they align in the same size and orientation as the current page, as shown in FIG. 13. This would serve to provide an uncluttered on-screen presentation of the document.

In state 1 of FIG. 13, the current flag stored in the page data table memory 6 is set to the first page as shown in FIG. 12(a). In this condition the first page is selected as the current page so that frames of the other pages are shown in the same size (A3) and orientation (portrait format) as the first page. In state 2 of FIG. 13, the current flag stored in the page data table memory 6 is set to the second page as shown in FIG. 12(b). In this condition the second page becomes the current page so that frames of the other pages are shown in the same size (A4) and orientation (landscape format) as the second page. Frames of the individual pages are produced in a similar way in state 3 of FIG. 13 as well.

Figure 14:
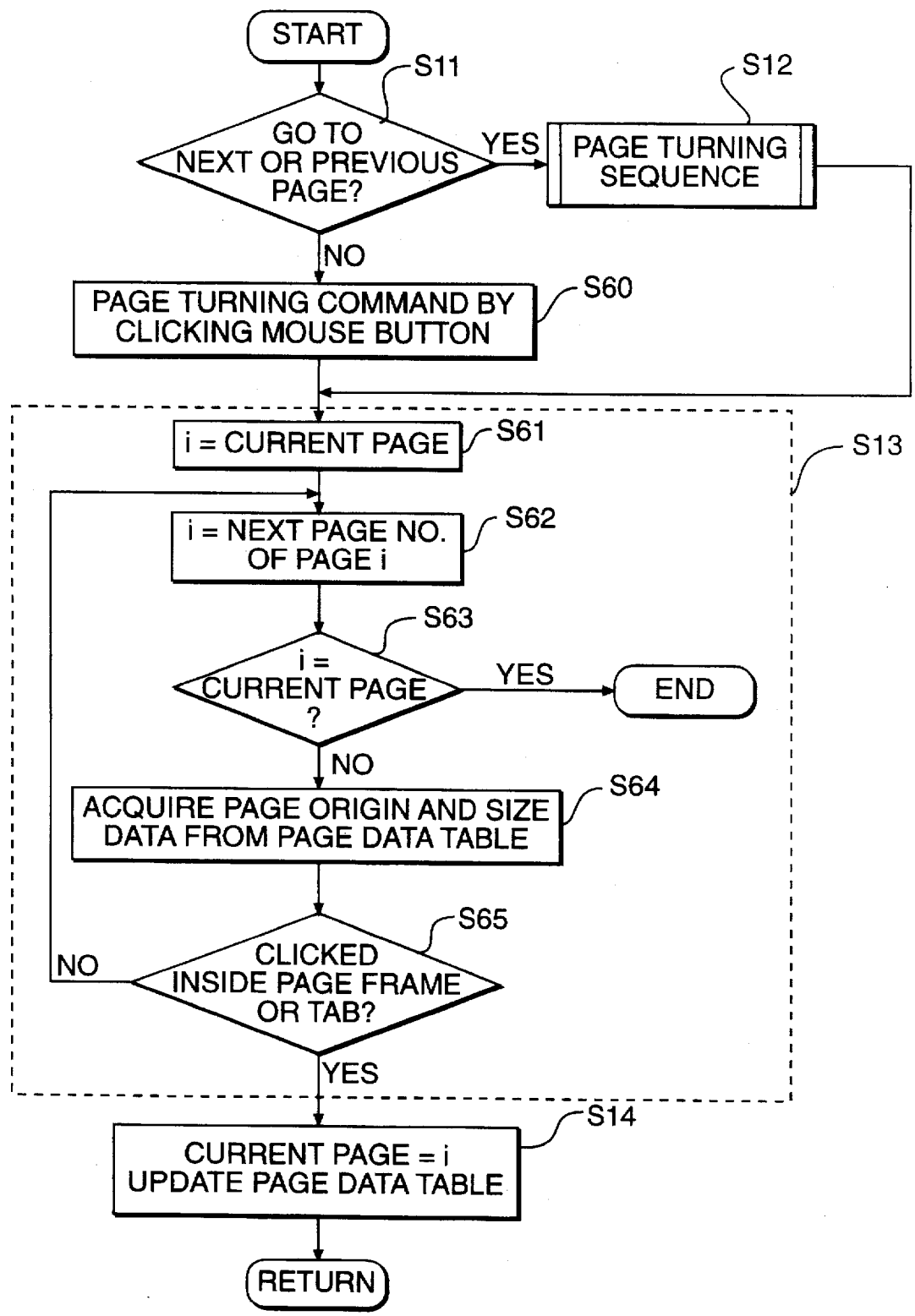
FIG. 14 is a flowchart showing another form of page turning sequence.

FIG. 14 shows a procedure of another form of page turning sequence which involves a multiple-page jump shown in step S13 of FIG. 5.

Figure 15A:
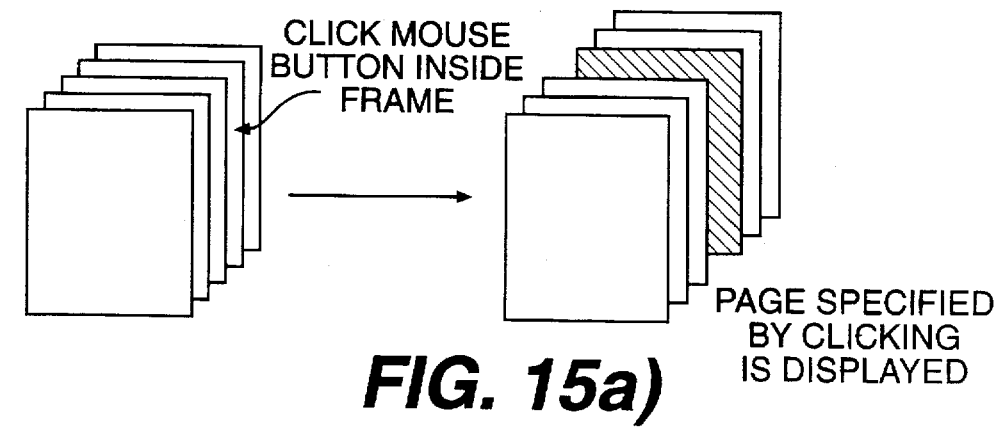
FIGS. 15(a)–15(b) are conceptual diagrams illustrating how the document is displayed in alternative methods of page turning sequence.
Figure 15B:
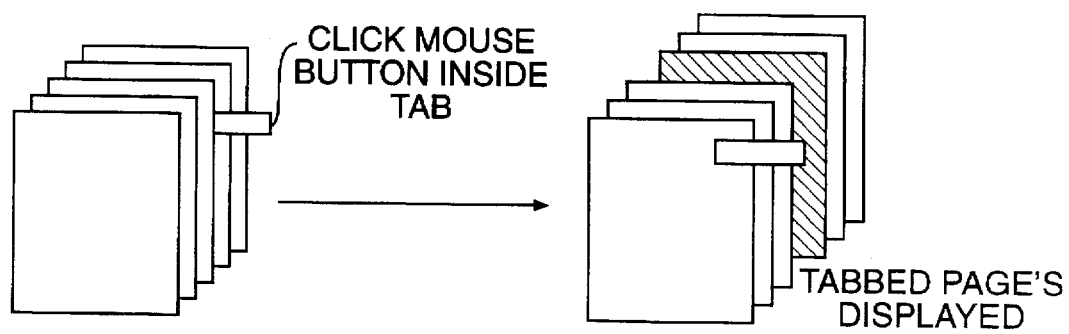

This form of page turning sequence is executed when the user clicks a mouse button inside the frame of a desired page as shown in FIG. 15(a) or inside a tab attached to the desired page as shown in FIG. 15(b). In either case, the page specified by clicking the mouse button becomes the current page.

Referring to the flowchart of FIG. 14, when a command is entered by clicking the mouse button (step S60), the current flag transfer circuit 13 begins to perform a page turning sequence (step S13 which includes steps S61 to S65), whereby the current flag data stored in the page data table memory 6 is updated (step S14).

The page turning sequence of steps S61 to S65 will now be described in detail. First, a variable i is set to denote the page number of the current page of the document and an initialization process is executed (step S61). The value of the variable i is then incremented to designate a next page (step S62) and it is judged whether the new value of the variable n corresponds to the current page of the document (step S63).

If it is judged that the value of the variable i corresponds to the current page, the operation flow escapes the subroutine of FIG. 14 since the cyclic execution of the page turning sequence is already finished for all the pages of the document at this point. If the value of the variable i designates other than the current page, page origin and size data of the ith page, which is designated by the value of the variable i, are read out from the page data table memory 6 (step S64).

Then, it is judged whether the mouse button has been clicked inside the page frame defined by the page origin and size data or inside the tab attached to the ith page (step S65). If the click point does not exist inside the page frame or tab, the operation flow returns to step S62, from where the page turning sequence is executed again for a next page.

If the click point lies inside the page frame or tab, the page designated by the variable i should be made the current page. In this case, the current flag is set to page i and the current flag data stored in the page data table memory 6 is updated accordingly (step S14).

In this form of page turning sequence involving a multiple-page jump, the document image is shown on the screen of the display unit 3 in accordance with the updated data contents of the page data table memory 6, allowing the user to find out at a glance where the first page is presently located from the on-screen document image in the same way as previously discussed.

Figures 16, 19, 20:
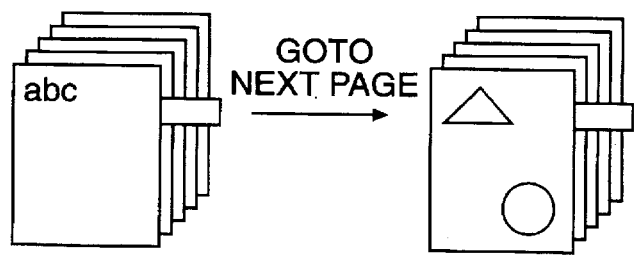
FIG. 16 is a diagram showing an example of data contents stored in the page data table memory according to a second embodiment of the invention.
FIG. 19 is a diagram showing an example of data contents stored in the page data table memory according to a third embodiment of the invention.
FIG. 20 is a conceptual diagram illustrating how the document is displayed in a page turning sequence according to the third embodiment of the invention.
Figure 17:
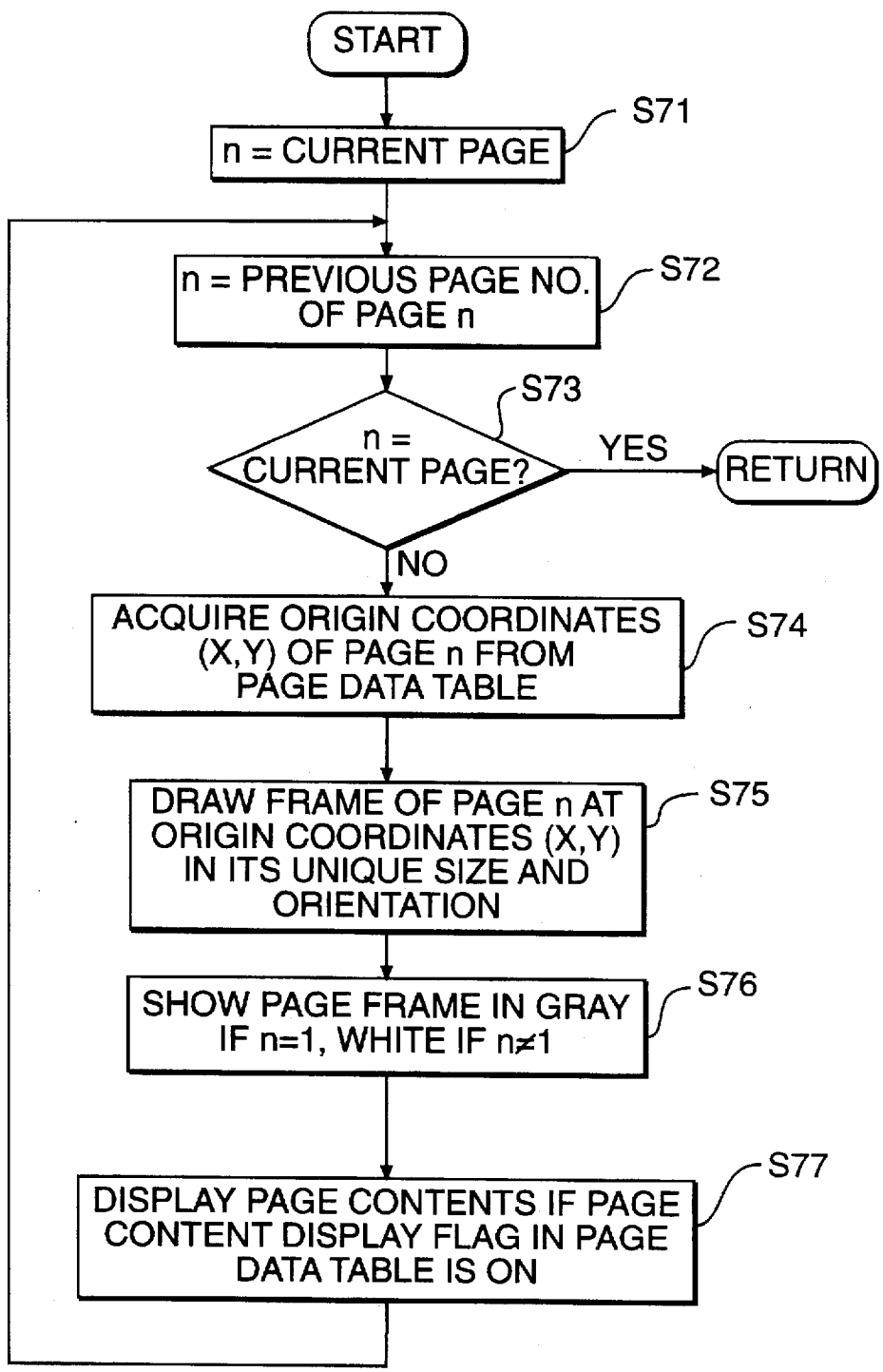
FIG. 17 is a flowchart showing a document image display sequence according to the second embodiment of the invention.

FIGS. 16 to 18 show a second embodiment of the invention.

In this embodiment, all pages of a document including its current page are displayed in their respective sizes and orientations, and it is made possible to show contents of each individual page if it is so requested. To make this possible, the page data table memory 6 stores information as shown in FIG. 16, for instance. This embodiment is essentially the same as the first embodiment except that the display processor 7 performs page frame drawing and page content display operations according to such pieces of information as shown in FIG. 16.

Specifically, the page data table memory 6 stores for each individual page a page content display flag which determines whether to show the contents of the relevant page. This flag is set to ON for a page whose contents should be displayed, OFF for a page whose contents need not be displayed, based on user commands entered via the input device 1.

What is characteristic of this embodiment is that it involves a routine shown in FIG. 17 which corresponds to a combination of the document thickness display sequence (step S3) and page content display operation (step S4) shown in FIG. 4.

First, a variable n is set to denote the page number of the current page of the document (step S71). Then, the value of the variable n is altered to designate a previous page (step S72) and it is judged whether the new value of the variable n corresponds to the current page of the document (step S73). It is to be noted that the page immediately preceding the current page is the last page of the document in initial conditions.

If it is judged that the value of the variable n corresponds to the current page, the operation flow escapes the routine of FIG. 17 since the document thickness display sequence is already finished for all the pages of the document at this point. If the value of the variable n designates other than the current page, page origin coordinates (X, Y) of the nth page, which is designated by the value of the variable n, are read out from the page data table memory 6 (step S74).

A frame of the nth page is drawn with its page origin located at thus acquired coordinates (X, Y) in accordance with the relevant page's size and orientation information which is stored in the page data table memory 6 (step S75). At this point, the page frame is shaded in gray if the nth page is the first page of the document while it is shown in white if the nth page is other than the first page to give a different look to the first page (step S76).

If the page content display flag of the nth page is set to ON in the page data table memory 6, the display processor 7 reads out information about the contents of the nth page from the document data storage device 4 and displays the acquired page contents inside the frame of the nth page (step S77).

The above sequence (steps S72 to S77) is executed repeatedly on all the successive pages of the document starting from its last page and, therefore, the individual pages of the document are overlapped one on top of another.

According to this display method, the individual pages of the document are shown in their respective sizes and orientations and page contents can be displayed not in the topmost page frame but also in a visible portion of any underlying page as shown in FIG. 18. This produces an easy-to-recognize image of the document as it will appear when printed.

In this form of document image presentation, the page turning sequence is executed in the same way as previously discussed. Shown in FIG. 18(a) is a document image that will be obtained when the third page is specified as the current page in the page data table memory 6 of which data contents are shown in FIG. 16. Shown in FIG. 18(b) is a document image that will be obtained when the second page is specified as the current page. Shown in FIG. 18(c) is a document image that will be obtained when the third page is specified as the current page.

FIGS. 19 and 20 show a third embodiment of the invention.

This embodiment is characterized in that each sheet of an on-screen document can be double-sided and flipped over from one side to the other depending on internal settings. To make this possible, the page data table memory 6 stores information as shown in FIG. 19, for instance. This embodiment is essentially the same as the previously described embodiments except that the display processor 7 performs page frame drawing and page content display operations according to such pieces of information as shown in FIG. 19.

Specifically, the page data table memory 6 stores for each individual sheet of the document a double-sided usage flag and a reverse side display flag. The double-sided usage flag is set to TRUE for a double-sided sheet, FALSE for a single-sided sheet. In addition, the reverse side display flag is set to ON for a sheet whose reverse side should be displayed when requested, OFF for a page whose reverse side should not be displayed, based on user commands entered via the input device 1.

It will be understood from the above description that the display processor 7 controls presentation of the on-screen document image based on the information stored in the page data table memory 6 in this embodiment. A sheet of the document is flipped over as shown in FIG. 20 when the user enters a page turning command for that sheet only if the corresponding double-sided usage flag and reverse side display flag are set to TRUE and ON, respectively.

In the foregoing embodiments, the first page is displaced from its preceding page by a larger amount than any other pages of the document and its page frame is shown in gray to give a different look to the first page. It is, however, possible to produce an easy-to-recognize image of the first page only by increasing the amount of page frame displacement.

There would be various other approaches to show the first page differently from the other pages of the document. For example, the frame of the first page may be shown in a different color or enclosed by lines having a different thickness.

What is claimed is:

1. A document display apparatus for displaying a document containing a plurality of pages on a screen in such a manner that one page lies on top of another with successive displacements, said apparatus comprising:

an input device for entering page turning commands;

a page data table memory for storing information on a layering sequence and display locations of the individual pages as well as a selection of a page which should currently be shown in a topmost layer;

a designator for specifying a page which should become the first page of the document based on the layering sequence information stored in said page data table memory;

a page location calculator for calculating new display locations of the individual pages when a page turning command is entered so that pages to be shown in other than the topmost layer are arranged with a preset amount of successive displacements from the page to be shown in the topmost layer except for the first page which is displaced by a larger amount than the other pages;

an updating device for updating the information stored in said page data table memory in accordance with the page turning command and newly calculated display locations; and a display processor for producing on-screen images of the individual pages based on the information stored in said page data table memory.

2. A document display apparatus according to claim 1, wherein said display processor produces an on-screen image of the first page in a different way from the other pages.

3. A document display apparatus according to claim 2, wherein said page data table memory additionally stores information on formats of the individual pages, and wherein said display processor produces images of the pages to be shown in other than the topmost layer in the same format as the page to be shown in the topmost layer.

4. A document display apparatus according to claim 2, wherein said page data table memory additionally stores information on formats of the individual pages, and wherein said display processor produces on-screen images of the individual pages in their respective formats.

5. A document display apparatus according to claim 4, wherein said display processor can display data contents of an underlying page in such a portion thereof that shows outside any overlying page.

6. A document display apparatus according to claim 1, wherein said page data table memory additionally stores information on formats of the individual pages, and wherein said display processor produces images of the pages to be shown in other than the topmost layer in the same format as the page to be shown in the topmost layer.

7. A document display apparatus according to claim 1, wherein said page data table memory additionally stores information on formats of the individual pages, and wherein said display processor produces on-screen images of the individual pages in their respective formats.

8. A document display apparatus according to claim 7, wherein said display processor can display data contents of an underlying page in such a portion thereof that shows outside any overlying page.

* * * * *